Nov. 19, 1968 J. A. CHRISTOPHER 3,411,433

ALUMINUM FOIL

Filed April 19, 1966 2 Sheets-Sheet 1

INVENTOR
JOHN A. CHRISTOPHER

BY

Irwin C. Alter

ATTORNEY

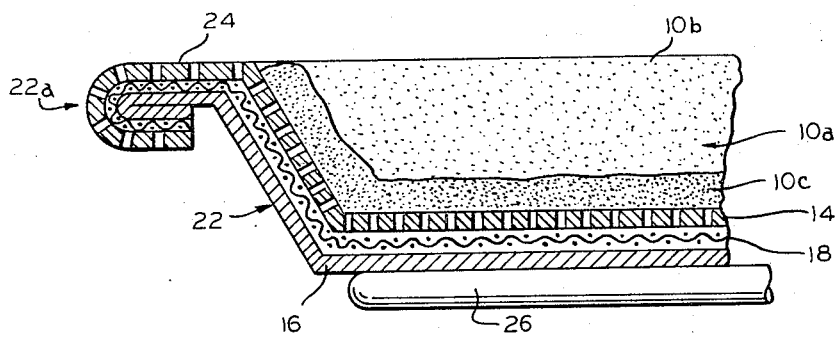
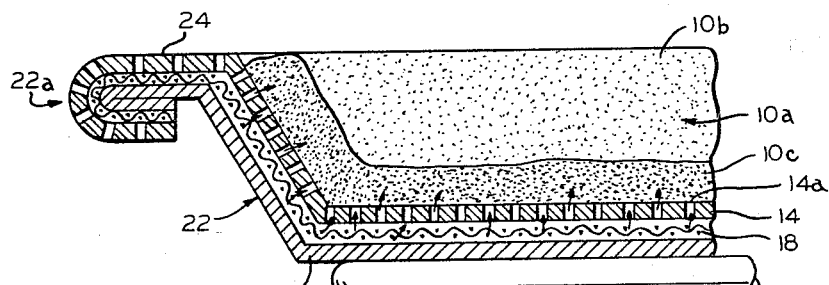
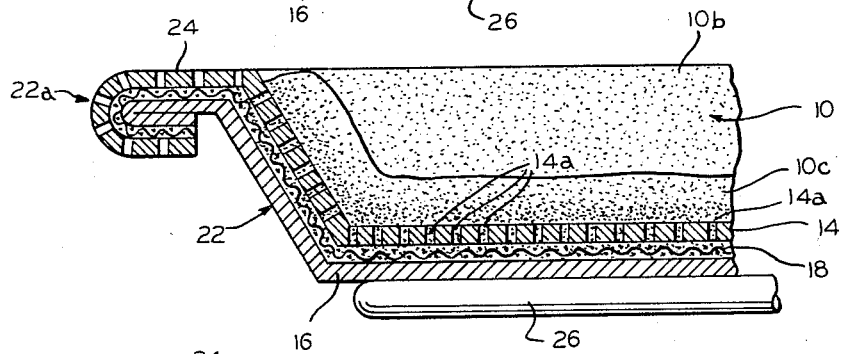
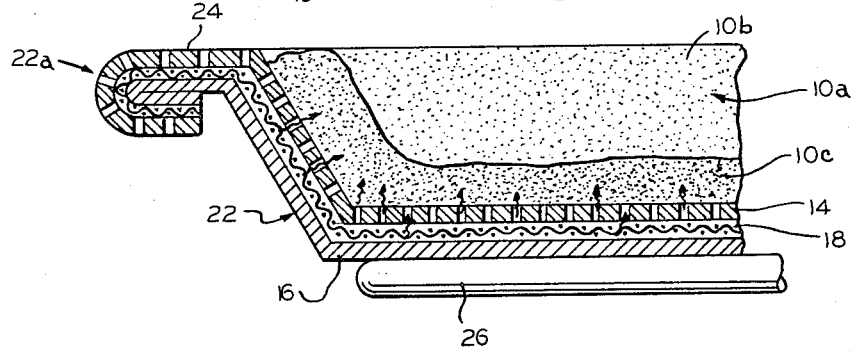

United States Patent Office 3,411,433
Patented Nov. 19, 1968

3,411,433
ALUMINUM FOIL
John A. Christopher, 261 Kenmore Ave.,
Elmhurst, Ill. 60126
Filed Apr. 19, 1966, Ser. No. 543,639
4 Claims. (Cl. 99—446)

ABSTRACT OF THE DISCLOSURE

Baking containers comprised of foil materials. The container has three laminated layers. The top layer is of perforated foil, the bottom layer is of imperforated foil, and the center layer is made of a meshed material designed to entrap air and to absorb the grease and moisture flowing during the baking process from the baked goods within the pan, through the perforations of the first layer.

---

This invention relates generally to an improved aluminum foil and more particularly to an improved aluminum foil to be formed in the shape of a baking container such as a pie plate or other container used in baking products such as frozen pies, pizza pies, and the like.

One of the primary difficulties with regard to using aluminum foil for baking pies, pizza pies, or other foods, is that the crusts thereof are not thoroughly baked and ready for eating at the same time as the fillings thereof. On the other hand in those situations where the crust is thoroughly baked, the fillings are usually burnt and are therefore tasteless or ruined. This condition is brought about because, in reality, baking is not taking place when present foils are being used. With present foils, what is actually taking place is "semi-baking and frying."

When products are sold in the market place for baking with present-day aluminum foil baking containers, the instructions on the package direct the consumer to place a bake sheet or cookie sheet in a preheated oven and thereafter place the product and foil containing the product on top of the bake sheet or cookie sheet. When the product is placed on a bake sheet as instructed, the bake sheet proximate to the bottom of the foil is immediately cooled due to loss of heat. The heat of the bake sheet being transmitted by conduction to the aluminum foil, travels upward along the sides of the aluminum foil in addition to travelling through the crust and filling. In addition to this, the product contained in the aluminum foil is being heated from underneath by both radiation and convection. However, as the rays or convection currents hit the foil, most of the heat therefrom is deflected off the foil and does not travel through the crusts of the products. The only heat therefore which has anything to do with thoroughly baking the crust must come from conduction from underneath the product, but it has been found that the heat supplied through conduction is insufficient to thoroughly bake the crust without ruining the fillings. What actually happens is that as the product becomes warmed the greases and shortening begin to separate from the crust and the filling along with any moisture that is contained in the filling. This grease, moisture and shortening naturally gravitate down to the bottom of the container. While this is going on, the filling or top of the product is being baked by warm air through radiation and convection. Naturally, any cold air contained in the product is also caused to gravitates to the bottom of the container and thereby keep the bottom of the product and container cooler than the rest of the product and container. In the meantime, as the temperature at the bottom of the container or foil begins to equalize with the rest of the product, a "semi-baking and frying" condition begins to take place. As frying takes place, an adhesion is created between portions of the crust and the aluminum foil. As heat is generated with the frying condition, heat is obstructed in travelling through the product because of the adhesion between the crust and the foil. The heat is caused to travel along the sides of the foil rather than through the crust. So, in addition to the adhesion caused by frying, the obstruction created thereby tends to further insulate the crust and prevent heat from being transmitted to the crust through the bottom of the foil container.

I have obviated the problems involved with present-day containers for baking by providing a new and improved foil which has a first perforated layer and a second nonperforated layer that are associated together and have a moisture absorbent material such as a fabric mesh sandwiched therebetween. The first layer perforations act as a means for exhausting air entrapped in the layers of foil upon heating the foil and therefore, although perforations are shown, other means of exhausting air are equally contemplated. The construction particularly enables one to bake crusts more thoroughly because of the fact that entrapped air in the foil is heated and is caused to be exhausted through the perforated layers circulated through the crust and the rest of the product by convection. Still further, my new and improved foil for baking containers prevents adhesions between the pie crust by absorbing the greases and moisture therefrom with the fabric material sandwiched therebetween. Still further, my new and improved foil enables the circulation of moist hot air through the crust and the rest of the product to achieve the thorough baking of a more tasty product.

It is, therefore, the primary object of this invention to provide a new and improved foil for use in baking containers.

It is still a further object of this invention to provide a new and improved baking container which enables one to thoroughly bake the crusts of the product without burning or destroying the taste of the filling of the product.

It is still even a further object of this invention to provide a new and improved baking container wherein a greater amount of hot air is caused to circulate through the crusts of a product to be baked.

Still another object of this invention is to provide a container for baking crusted products wherein the adhesion between the crust and the baking container is obviated.

Other and further objects of this invention will become readily apparent from reading the following description in conjunction with the drawings wherein:

FIG. 4 is an enlarged fragmentary view of a portion of FIG. 2 illustrating a portion of the pie plate of FIG. 1 with a crusted pie and filling contained therein;

FIG. 5 is a view similar to FIG. 4 illustrating a pie having entrapped warm air being forced upward through the perforated portions of my improved pie plate;

FIG. 6 is a view similar to FIG. 4 which illustrates grease, shortening and moisture by dotted lines separating from the pie crust and filler and travelling downward to be absorbed by my mesh type of fabric which is sandwiched between the improved foil; and FIG. 7 is another view similar to FIG. 4 illustrating moist air by means of arrows with curved leaders to show that any water evaporating from the fabric sandwiched between my foil is absorbed by the warm air travelling upward to enhance the crust and filling by means of circulating moist warm air therethrough.

Figure 1:
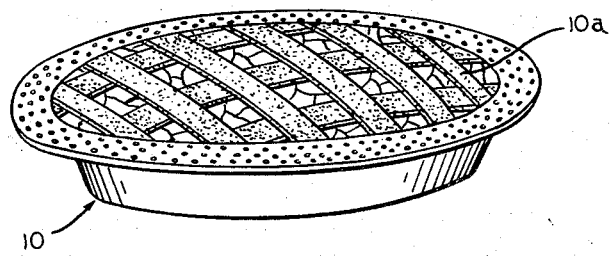
FIG. 1 is a pictorial view of a pie in a pie container preferably embodying the nef improved foil of my invention.

Referring generally to the drawings wherein like characters of reference illustrate corresponding parts throughout, my new and improved foil is preferably embodied in a round pie plate 10 as illustrated in FIG. 1 wherein a pie 10a is contained therein. It should be borne in mind that different shapes of containers can be formed to utilize my new and improved foil, and although my invention is being described with particular reference to pie plates, other forms of baking containers are also contemplated.

Figure 2:
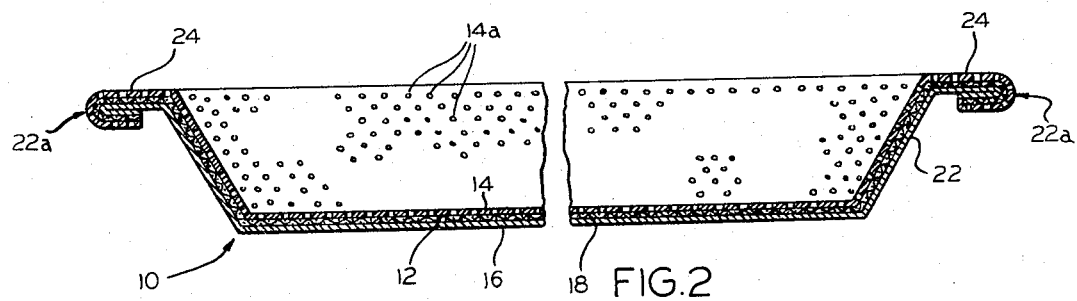
FIG. 2 is a sectional view taken along a plane passing through the line 2—2 in FIG. 3 and illustrating a half-sectional view of my pie plate without a pie contained therein.
Figure 3:
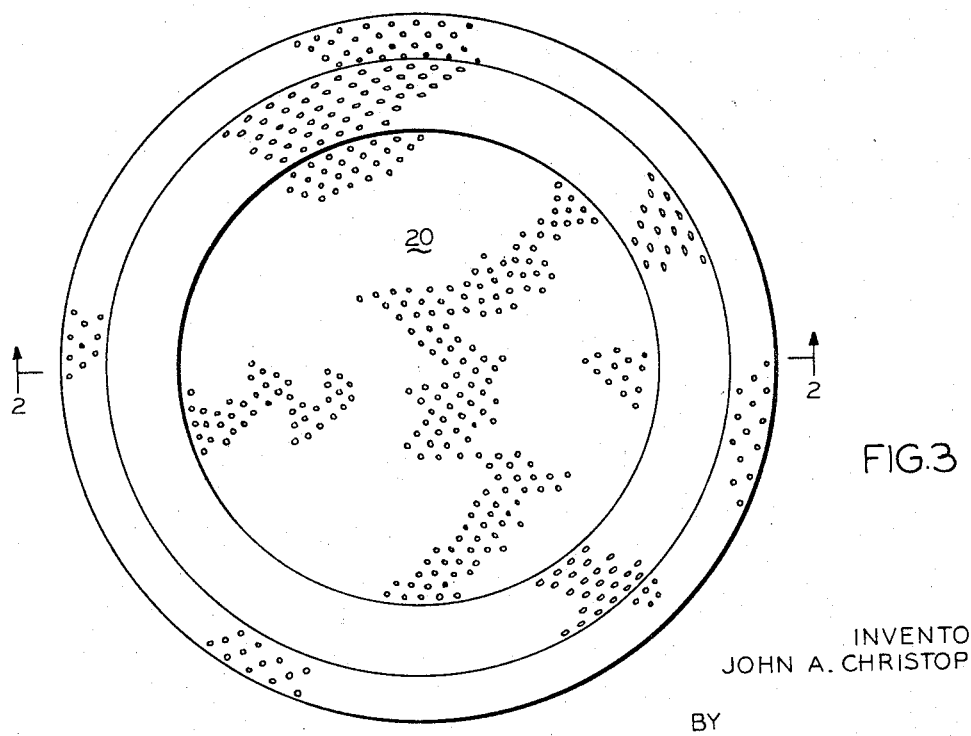
FIG. 3 is a top view of the pie plate of FIG. 1 without the pie contained therein.

Turning now to the basic configuration of my new and improved foil, it will be seen from FIG. 2 that the foil which is generally designated by the character reference 12, comprises a first perforated layer 14 and a second nonperforated layer 16 having a moisture absorbent maternal such as a meshed cotton fabric 18 sandwiched therebetween. The perforated layer 14 is illustrated with circular perforations 14a; but it should be realized that other shapes of perforations are contemplated. In forming the foil to the shape of a pie plate as illustrated in FIGS. 2 and 3, the plate is shown having a flat-bottom 20 with a truncated wall 22 extending from the periphery of the flat bottom and flaring outwardly. The wall 22 terminates with the bent-over portion 22a. The bent-over portion has an upper flat surface which defines the top of the pie plate and it extends from the top of the truncated wall 22 all the way therearound. The lower part of the bent-over portion forms a bead around the under-side of the upper flat surface.

Turning now to FIGS. 4, 5, 6 and 7, the mode of operation of my new and improved foil can be explained with reference to what happens when the pie plate 10 is placed on a preheated baking sheet 26 in an oven (not shown). The pie 10a is shown in the figures as having a filling 10b contained in a crust 10c. When the pie plate 10 is initially placed on a preheated baking sheet 26 in a preheated oven, as illustrated in FIG. 5, initially the air which is entrapped in between the first and second layers of foil is heated and due to the decrease in density thereof travels upward through the perforations 14a through the crust 10b of the filler 10a. The warm air is designated by the arrows in FIG. 5.

As the crust and filling become heated, they are thawed out and in addition to the moisture gravitating downward through the perforations 14a, the shortening and grease from the crust are separated therefrom and also gravitate downward through the perforations 14a, as illustrated in FIG. 6. The shortening, grease and moisture are designated by the dots in this figure. It will be realized that as the moisture, grease and shortening gravitate downward through the perforations they are absorbed by the meshed cotton fabric 18. Any further heating of the pie plate thereafter causes the moisture remaining in the meshed cloth or between the layers of foil to be evaporated and forced upward through the perforations 14a, the crust 10c and the filling 10a. This moist, warm air is designated in FIG. 7 by means of arrows having wavy leaders. This moist warm air of course enhances the flavor of the product.

From the description of my new and improved foil, in connection with the baking of pies, it can be seen that I have accomplished the objects of this invention in a remarkably unexpected fashion. It can be seen that by forming the foil that I have illustrated in the shape of a pie plate and using the same for pies, I have been able to thoroughly bake the crusts of a pie by forcing entrapped warmed air from the portion between the first layer of perforated foil and the second layer of non-perforated foil to circulate through the crust and product. In addition thereto, by providing the cotton fabric between the perforated and non-perforated layers of the foil for absorbing moisture, grease and shortening. I have obviated the adhesion that usually forms between the crust and a baking container due to the separation of these materials from the product being baked. By obviating the adhesion the circulation of air through the pie crust in enhanced and baking rather than "semi-baking and frying" occurs at the bottom and throughout the product.

As I have mentioned throughout this description, although I have described my new improved foil in connection with a pie plate, I do not wish to be restricted in this respect as my new and improved foil can be used in other types of baking containers and while I am describing only one embodiment of my invention, I do not wish to be limited to the precise features of the construction set forth but desire to avail myself of all modifications within the scope of the appended claims. Still further, it should be realized that while I have described my improved foil as having a moisture absorbent material sandwiched therein, it should be understood that it is not necessary to include any material in between the foil. When no material is inserted between the layers of foil, air will still be caused to circulate but there will be no moisture absorbent means in the foil.

What I claim and desire to secure by Letters Patent of the United States is:

1. A foil formed into the shape of a baking container for baking products having crusts comprising:
   a first layer,
   a second layer comprised of solid sheet material,
   said first and second layers being attached together in opposing face to face relationship and entrapping air therebetween,
   said first layer having perforations therein for enabling said entrapped air to escape said foil when heated,
   moisture absorbent mesh material interposed between the said first and second layers whereby moisture and greases separated from said product upon heating are absorbed by said material and air is entrapped in said mesh material,
   said first layer being disposed for contacting relationship with the crust of the product whereby the air that is entrapped between said first and said second layer and heated, is caused to circulate through the crust of the product contained in said baking container to give enhanced baking characteristics to said foil.

2. A foil, as defined in claim 1, wherein said moisture absorbent mesh material is a fabric.

3. A foil, as defined in claim 1, which is shaped in a plate form to bake a circular product, such as a pie, pizza pie or the like, said plate form including a circular bottom having a truncated wall extending upwardly and outwardly therefrom, whereby said entrapped air is caused to flow through the crust of the product upon heating said plate and moistures and greases which separate from said product gravitate downward through said perforations and are absorbed by said material or evaporated from said cloth.

4. A foil, as defined in claim 3, wherein said perforations are cylindrical shape.

References Cited

UNITED STATES PATENTS

| 573,045 | 12/1896 | Snyder | 126—275 |
|---|---|---|---|
| 1,402,065 | 1/1922 | Griffin | 249—113 |
| 2,027,296 | 1/1936 | Stuart et al. | 161—113 |
| 2,042,070 | 5/1936 | McCaskell. | |
| 2,593,592 | 4/1952 | Miller | 99—446 |
| 3,040,949 | 6/1962 | Foote | 229—2.5 |
| 3,127,828 | 4/1964 | Fine | 99—446 |
| 3,320,075 | 5/1967 | Lemmons | 99—194 X |

WALTER A. SCHEEL, *Primary Examiner.*

JOHN NEARY, *Assistant Examiner.*